UNITED STATES PATENT OFFICE.

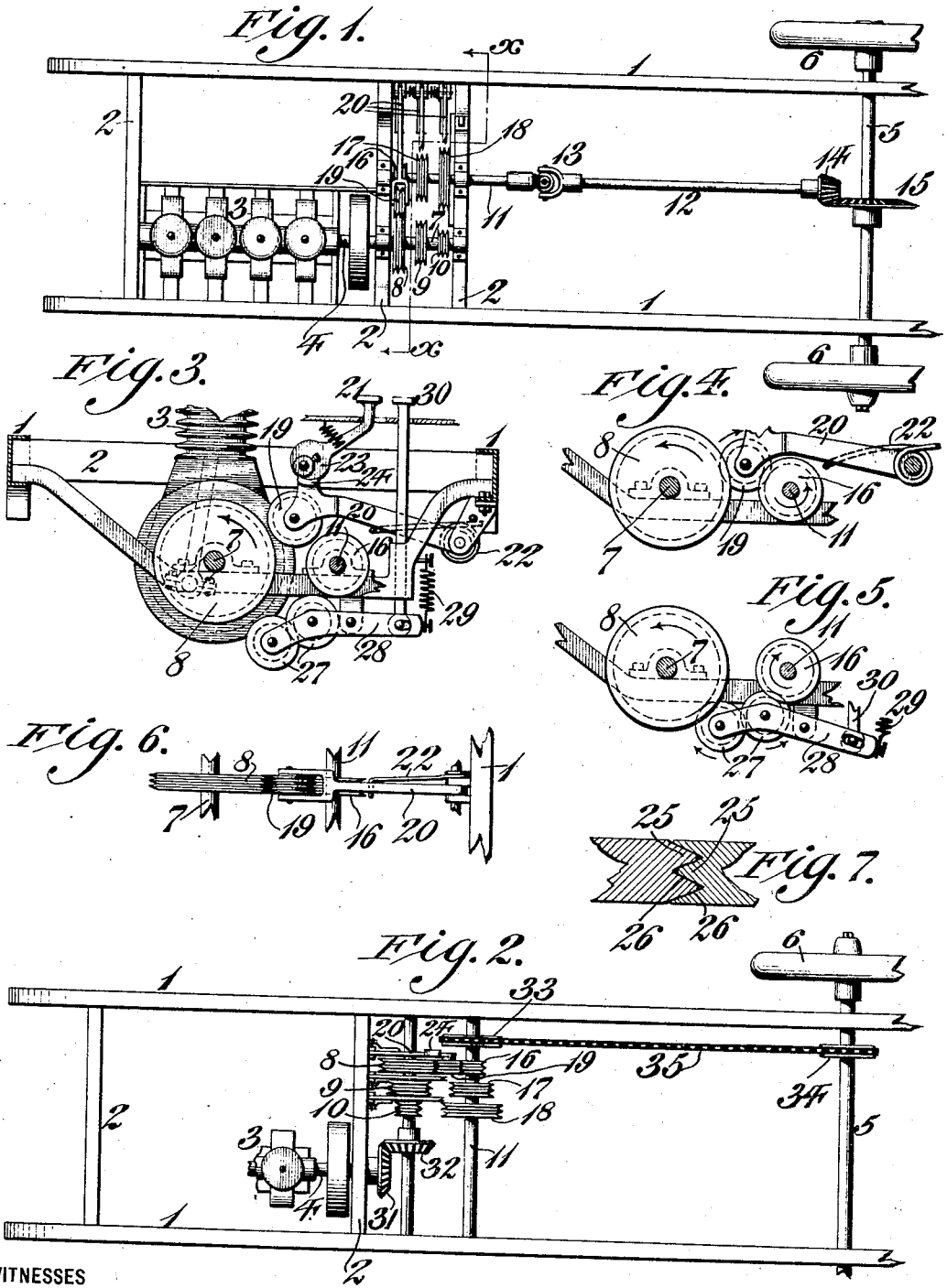

WILLIAM S. KINDLE, OF PHILADELPHIA, PENNSYLVANIA.

VARIABLE-SPEED GEARING.

980,794. Specification of Letters Patent. Patented Jan. 3, 1911.

Application filed May 3, 1910. Serial No. 559,151.

*To all whom it may concern:*

Be it known that I, WILLIAM S. KINDLE, a citizen of the United States, residing in the city and county of Philadelphia, State of Pennsylvania, have invented a new and useful Variable-Speed Gearing, of which the following is a specification.

My invention consists of an improved variable and reversing gearing, in which rotary motion, constant as to speed and direction, may be transmitted at varying speed and reversed.

It further consists of improved means whereby such changes in speed and direction of motion may be accomplished.

It further consists of other novel features of construction, all as will be hereinafter more fully set forth.

For the purpose of explaining my invention, the accompanying drawing illustrates a satisfactory reduction of the same to practice, but the important instrumentalities thereof may be varied, and so it is to be understood that the invention is not limited to the specific arrangement and organization shown and described.

While this variable and reversing gear mechanism may be employed in various mechanical organizations in which a motor running at constant speed and in one direction is required to have such motion transmitted at varying speeds, and in reverse direction, such gearing is especially adapted for motor cars or boats, and I have therefore illustrated the gearing as employed in a motor car or automobile.

Figure 1 represents a top plan view of as much of the chassis of a motor vehicle provided with my improvement as is necessary to illustrate the application of the same. Fig. 2 represents a similar view illustrating a different form of application of the device. Fig. 3 represents a transverse section on the line x—x Fig. 1. Fig. 4 represents a detail side view of the speed changing gear in engagement. Fig. 5 represents a similar view of the reversing gear in engagement. Fig. 6 represents a detail top view of the speed changing gear. Fig. 7 represents a sectional detail view of the interlocking friction rims of the wheels in the gearing.

Similar numerals of reference indicate corresponding parts in the figures.

Referring to the drawings—the chassis frame of the motor vehicle to which my improvement is illustrated as applied, has two side sills, 1, and cross sills 2, and a motor, in the present instance, a gasolene engine 3, is supported at one end of such frame to drive a longitudinally journaled motor shaft 4. An axle 5 carrying drive-wheels 6, is transversely journaled at the opposite end of the frame.

In the form illustrated in Figs. 1 and 3, the motor has a longitudinal extension forming a driving shaft 7, upon which are secured a plurality of friction gear wheels, in the present instance, three wheels 8, 9 and 10, of decreasing diameters. A driven shaft or transmission shaft is longitudinally journaled in the chassis frame, and consists of a shaft section 11 and another section 12, connected to the former by a universal joint 13. The rear end of the transmission shaft carries a bevel gear 14, meshing with a bevel gear 15, upon the axle. The driven shaft section 11 has a plurality, in the present instance, three friction wheels 16, 17 and 18, of increasing diameters and opposed to and registering with the wheels upon the driving shaft. Transmission wheels 19, are journaled in levers or arms 20 pivoted upon the frame and having suitable means for actuating them, such as treadles or pedals 21, and springs 22 for returning them to normal inoperative position. The transmission wheels are so arranged that each will be brought down partly between a pair of friction wheels when the lever is depressed by the pedal, to engage both wheels and thus transmit rotary motion from a driving wheel to a driven wheel. The pedals preferably transmit motion to the levers by eccentrics 23, at their inner pivoted ends, bearing against suitable seats 24, upon the levers. The friction rims of the wheels are preferably grooved to have their ribs 25 and grooves 26 interlock and engage, and said ribs and grooves are V-shaped in cross section so as to afford the greatest possible frictional engagement. As the friction wheels are so arranged that motion is respectively transmitted from a wheel of large diameter to one of smaller diameter, between two wheels of the same diameter, and from a wheel of small diameter to one of larger diameter, three variations of speed are provided, respectively, high speed, moderate speed and slow speed. Two transmission and reversing wheels 27 engaging one another, are journaled in an arm or lever 28, fulcrumed upon the frame, such wheels being provided to register with one or more pairs of friction wheels or gears, and said levers have springs 29 for normally retaining the transmission wheels out of engagement with the friction wheels, and have treadles or pedals 30, connected to them to bring the transmission wheels into engagement with a pair of friction wheels, when depressed. As the rotary motion of a driving wheel is transmitted through two engaging transmission wheels, the direction of rotation of the driven wheel will be the same as that of the driving wheel, or a reversal of the rotation of the driven shaft through the single transmission wheels of the speed changing set.

In the form illustrated in Fig. 2, the motor shaft carries a bevel gear 31, which meshes with a bevel gear 32 upon the driving shaft, and the driven shaft has a sprocket wheel 33, which drives a sprocket wheel 34 upon the axle, through a sprocket chain 35. The driving shaft and the driven shaft are thus transversely journaled in the chassis frame, and chain transmission mechanism may thus be employed instead of the shaft and gear transmission mechanism shown in Fig. 1.

The transmission wheels which effect the transmission from the driving wheels to the driven wheels are separately and individually actuated by the levers upon which they are supported and the pedals or other means for rocking each lever, and the transmission wheels are normally held out of engagement with the friction wheels by their springs, so that all transmission ceases when no pressure is exerted upon the pedals.

While pedals are the most convenient means for actuating the levers in a motor vehicle, it is evident that handles may be provided for manual actuation of the levers.

Having thus described my invention what I claim as new and desire to secure by Letters Patent, is

1. In a device of the character stated, a driving shaft, a wheel upon said shaft, a driven shaft, a wheel upon said shaft, an arm, a transmission wheel to engage said wheels and journaled upon said arm, means acting against the latter to withdraw the said transmission wheel from engagement with the driving and driven wheel, and a pivoted lever having an eccentric engaging said arm.

2. In a device of the character stated, a driving shaft, a plurality of friction wheels of serially decreasing diameters upon said shaft, a driven shaft, a plurality of friction wheels of serially increasing diameters upon said driven shaft and opposite the wheels on the driving shaft, transmission wheels constructed to each engage a pair of friction wheels, arms having said former wheels journaled in their ends, springs acting upon said arms to normally withdraw the same from engagement, and levers having eccentrics and pivoted to have the latter operatively engage each one wheel carrying arm.

3. In a device of the character stated, a driving shaft, a friction wheel on such shaft, a driven shaft, a friction wheel on said shaft, two transmission and reversing wheels engaging each other and constructed to each engage one of the friction wheels, an arm upon which said transmission and reversing wheels are journaled, means acting upon said arm to normally keep said latter wheels out of engagement, and means for rocking the arm to bring said wheels into engagement with the friction wheels.

4. In a device of the character stated, a driving shaft, a wheel upon said shaft, a driven shaft, a wheel upon said shaft, an arm, a transmission wheel to engage said wheels and journaled upon said arm, means acting against the latter to withdraw said transmission wheel from engagement with the driving and driven wheel, a pivoted lever having an eccentric engaging said arm, two transmission and reversing wheels engaging each other and constructed to respectively engage the driving and the driven wheel, an arm upon which said transmission and reversing wheels are journaled, means acting upon said arm to normally keep latter wheels out of engagement, and means for rocking the arm to bring said wheels into engagement with the friction wheels.

WILLIAM S. KINDLE.

Witnesses:
JOHN A. WIEDERSHEIM,
WM. CANER WIEDERSEIM.